United States Patent
Chen

(10) Patent No.: US 6,811,366 B2
(45) Date of Patent: Nov. 2, 2004

(54) SCREW BAND WITH WASHERS

(76) Inventor: Ho-Tien Chen, P. O. Box 2-10, Tainan City (TW)

(*) Notice: Subject to any disclaimer, the term of this patent is extended or adjusted under 35 U.S.C. 154(b) by 0 days.

(21) Appl. No.: 10/390,425

(22) Filed: Mar. 14, 2003

(65) Prior Publication Data

US 2004/0179919 A1 Sep. 16, 2004

(51) Int. Cl.[7] ............................................. F16B 27/00
(52) U.S. Cl. ..................... 411/533; 411/442; 206/346
(58) Field of Search ................... 411/533, 441, 411/442, 999, 352, 353; 206/345–347, 338, 341

(56) References Cited

U.S. PATENT DOCUMENTS

| | | | | |
|---|---|---|---|---|
| 3,394,747 A | * | 7/1968 | Duffy | 411/353 |
| 3,452,636 A | * | 7/1969 | Cohen et al. | 411/371.1 |
| 3,892,313 A | * | 7/1975 | Lange | 206/346 |
| 4,930,630 A | * | 6/1990 | Habermehl | 206/347 |
| 5,542,323 A | * | 8/1996 | Habermehl et al. | 81/434 |
| 6,036,013 A | * | 3/2000 | Chen | 206/347 |
| 6,116,835 A | * | 9/2000 | Blacket et al. | 411/442 |

* cited by examiner

Primary Examiner—Flemming Saether

(57) ABSTRACT

A screw band with washers includes a screw band having a plurality of screw holes for screws respectively provided with a washer in advance to be positioned therein. Each screw hole has a pinching surface and a plurality of connect ribs are provided between each pinching surface and the screw band. The screw band further has a plurality of tooth grooves formed in opposite lengthwise sides to be fitted in by a tool and enable the screw band moved forward. A washer is fitted around the shank of each screw, located just under the lower surface of the screw band to sandwich the screw band together with the head of each screw so as to keep each screw vertical to the screw band to enable the screw correctly driven in an object. The diameter of each washer may be larger or smaller than that of the head.

1 Claim, 6 Drawing Sheets

SCREW BAND WITH WASHERS

FIELD OF THE INVENTION

This invention relates a screw band with washers, particularly to one provided with a plurality of screw holes for screws respectively attached with a washer in advance to be fitted through therein. Then each screw hole has a pinching surface, and a connect rib is provided between the pinching surface and the screw band. The screw band further has a plurality of tooth grooves formed in opposite lengthwise sides for teeth of a tool to fit thereinto move the screw band. Each screw has its shank fitted around with the washer and contacts with a lower surface of the screw band. Then the washer can have a diameter larger or smaller than that of the head of the screw, enabling the screws on the screw band driven just vertically in an object.

BACKGROUND OF THE INVENTION

A conventional screw band with washers shown in FIGS. 1, 2 and 3 includes a screw band 1, a plurality of screws 2 respectively fitted through a screw hole with its shank 20 closely contacting with its side surface 10, and then a clamp band 11 is then pushed out by a process machine to surround half of the threads 200 of each screw along with the screw band 1. Then a washer 3 is fitted around the shank of each screw 2, located very near the tip 21 of the screw and around the lower portion of the shank 20 so that if the screw 2 is inclined at the moment of driven by an electric or a pneumatic tool, the inner surface 30 of the washer 3 may rub against the surface of an object as shown in FIG. 3, and become not flat and impossible to prevent moisture from percolating in the object.

Next, the friction between the washer 3 and the surface of an object presents a hindrance for the screw 2 in driving operation in the object.

SUMMARY OF THE INVENTION

The object of the invention is to offer a screw band with washers, which have the washers possible to let the screw driven smoothly in an object, without any friction between the washer and the object.

The feature of the invention is the washer and the head of each screw sandwiching the screw band to keep each screw strictly vertical to the screw band so as to be driven correctly in an object.

BRIEF DESCRIPTION OF THE DRAWINGS

This invention will be better understood by referring to the accompanying drawings, wherein.

DETAILED DESCRIPTION OF THE INVENTION

Figure 1:
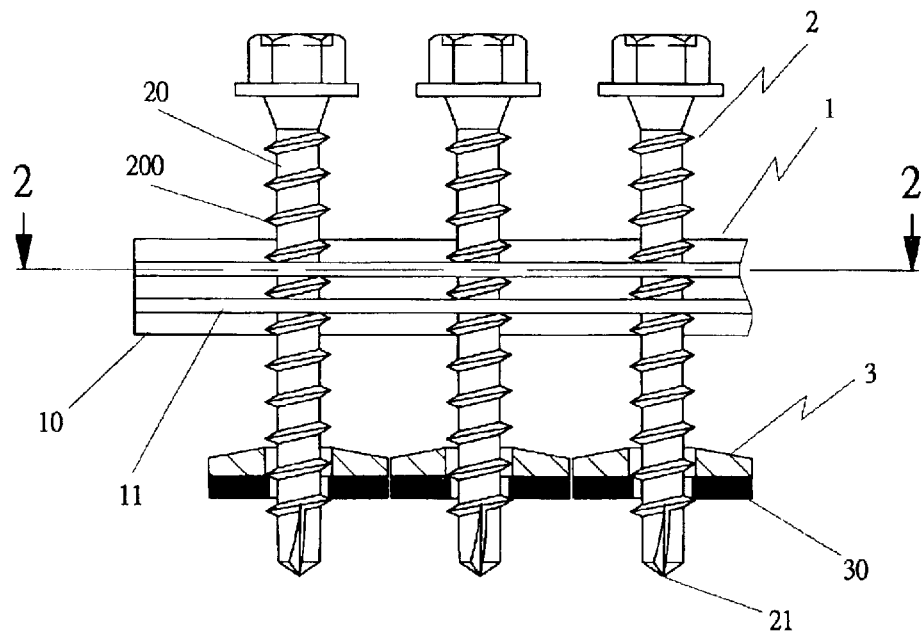
FIG. 1 is a side view of a conventional screw band with washers.
Figure 2:
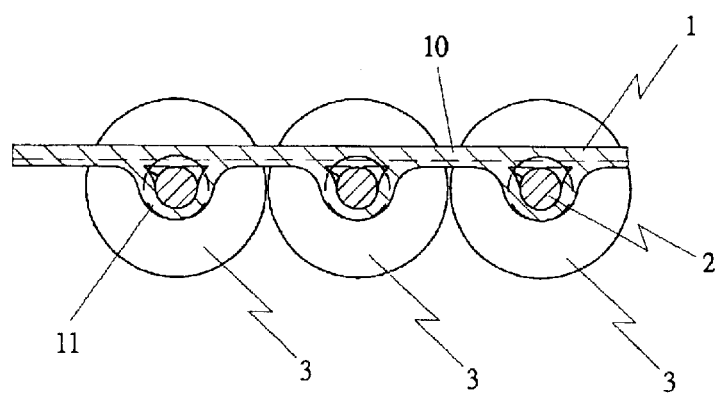
FIG. 2 is a cross-sectional view of the line 2—2 in FIG. 1.
Figure 3:
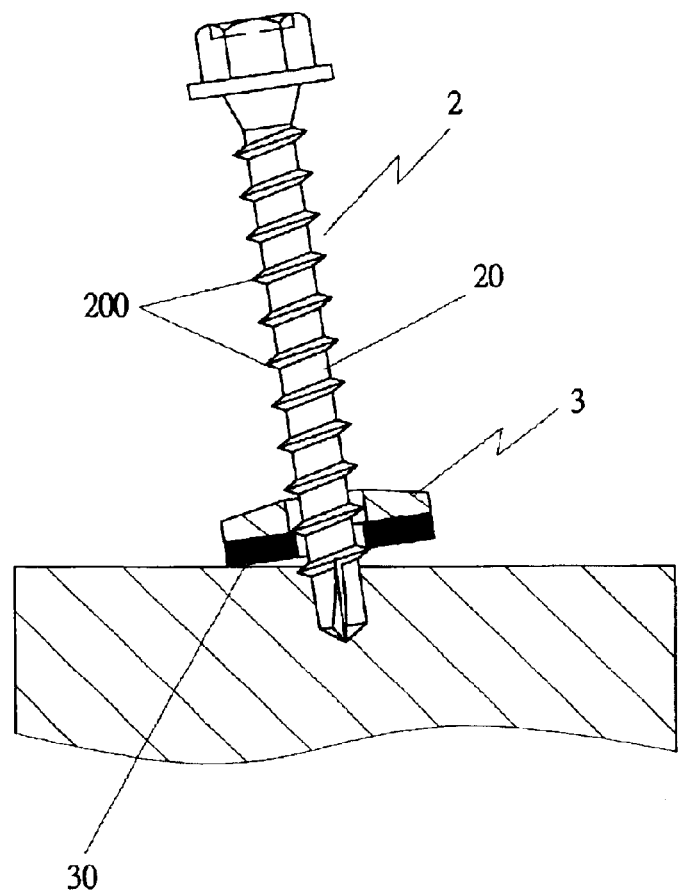
FIG. 3 is a side view of a screw kept in the conventional screw band with washers being driven in an object.
Figure 4:
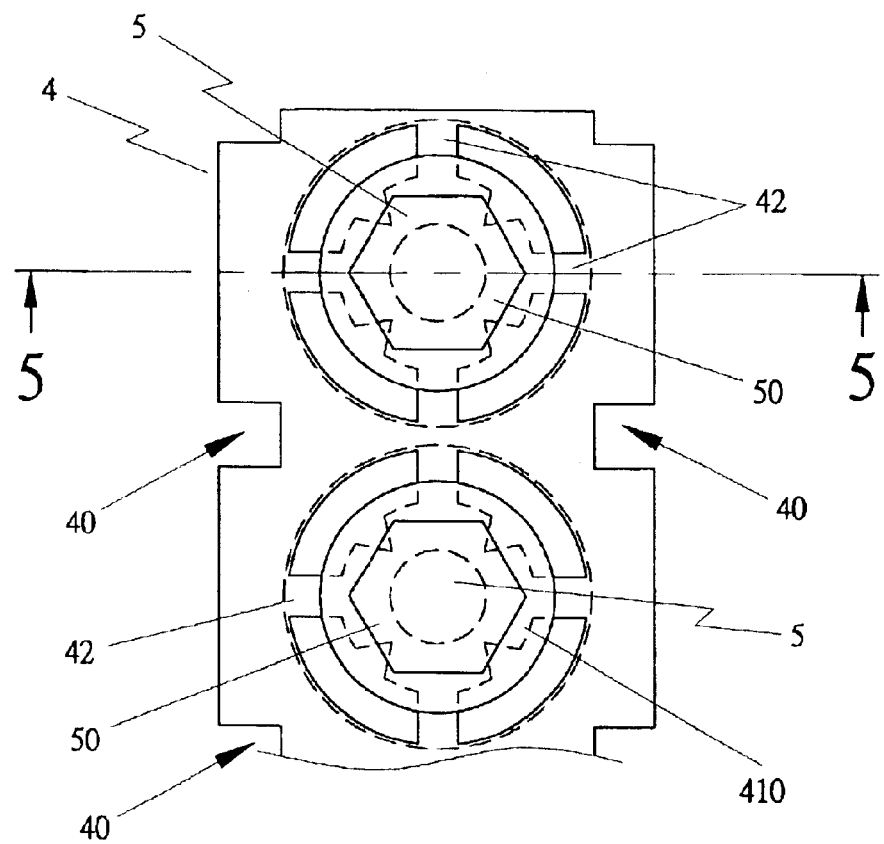
FIG. 4 is a partial upper view of a first preferred embodiment of a screw band with washers in the preset invention.
Figure 5:
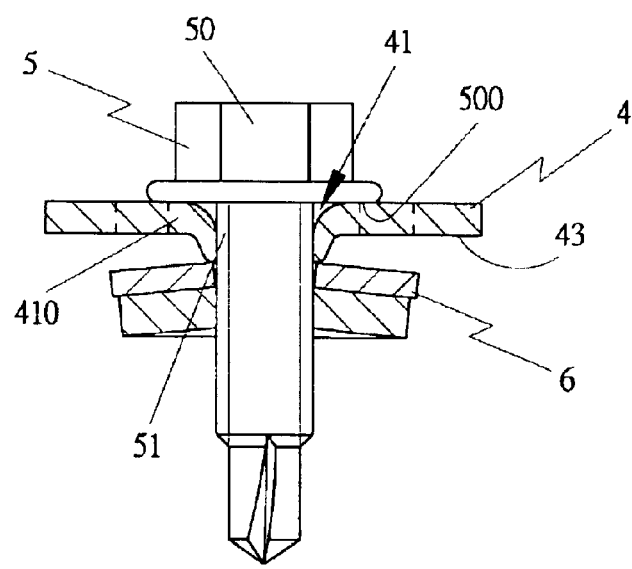
FIG. 5 is a cross-sectional view of the line 5—5 in FIG. 4.
Figure 6:
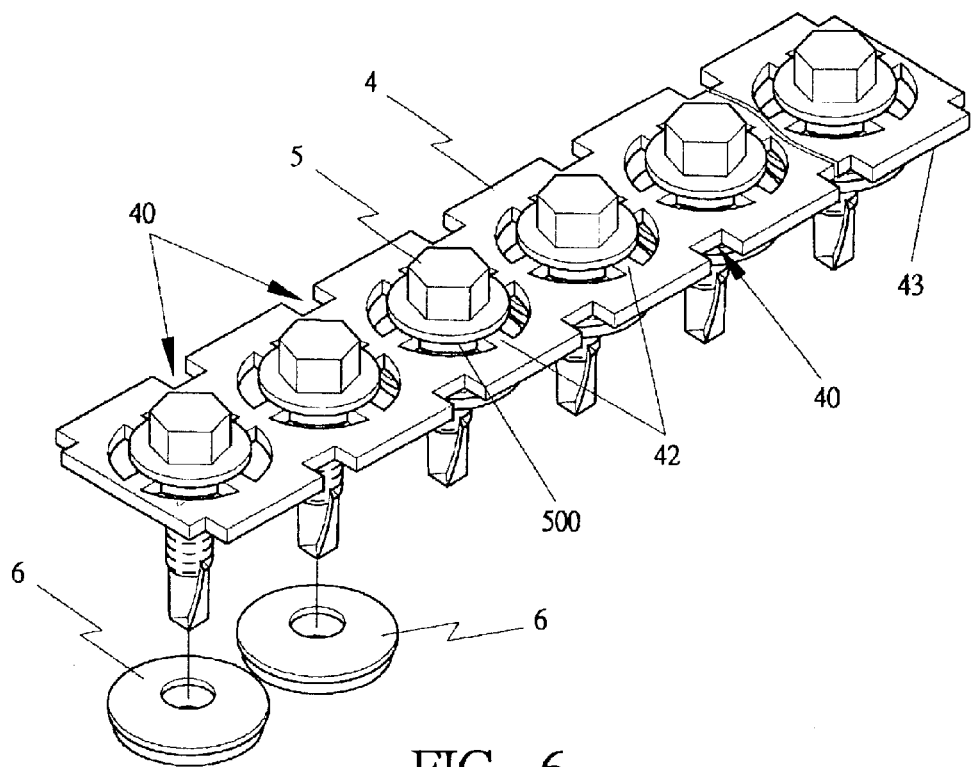
FIG. 6 is a partial exploded perspective view of the first preferred embodiment of a screw band with washers in the present invention.
Figure 7:
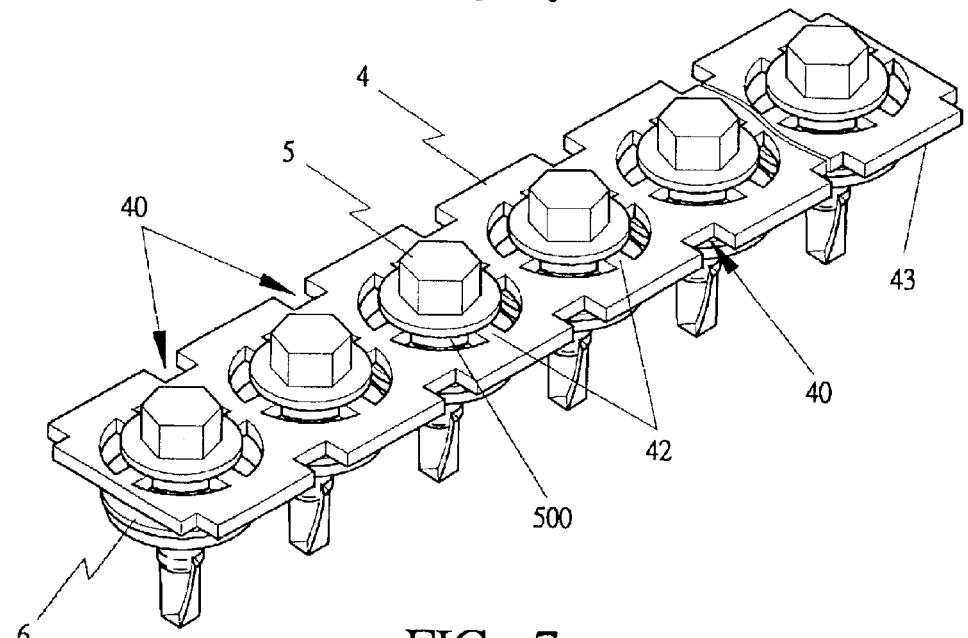
FIG. 7 is a perspective view of the first preferred embodiment of a screw band with washers in the present invention.

A first embodiment of a screw band with washers in the invention, as shown in FIGS. 4–7, includes a screw band 4, a plurality of tooth grooves 40 formed spaced apart equidistantly in opposite lengthwise sides of the screw band 4 so that the screw band 4 may be moved forward by operation of an electric or pneumatic tool, a plurality of screw holes 41 formed spaced apart equidistantly in the lengthwise center of the screw band 4 for screws 5 to fit therein. Each screw hole 41 has a pinching surface 410 to contact closely with a lower surface 500 of the head 50 of each screw 5 as shown in FIG. 5 so that each screw 5 may be kept strictly vertical to the screw band 4. Further the screw band 4 has a plurality of connect ribs 42 to be located between the pinching surface 410 and the screw band 4, Each screw 5 has its shank 51 fitted in the screw hole 41, and a washer 6 is fitted around the shank 51 of each screw 5.

The washer 6 is so located that its upper surface is in close contact with the lower surface of the screw band 4, having a diameter either larger or smaller than that of the head 50 of each screw 5. Therefore, the diameter of the washer 6 can be decided according to real necessity. The washer 6 can be fitted around each screw 5 after the screw 5 is attached on the screw band 4.

Figure 8:
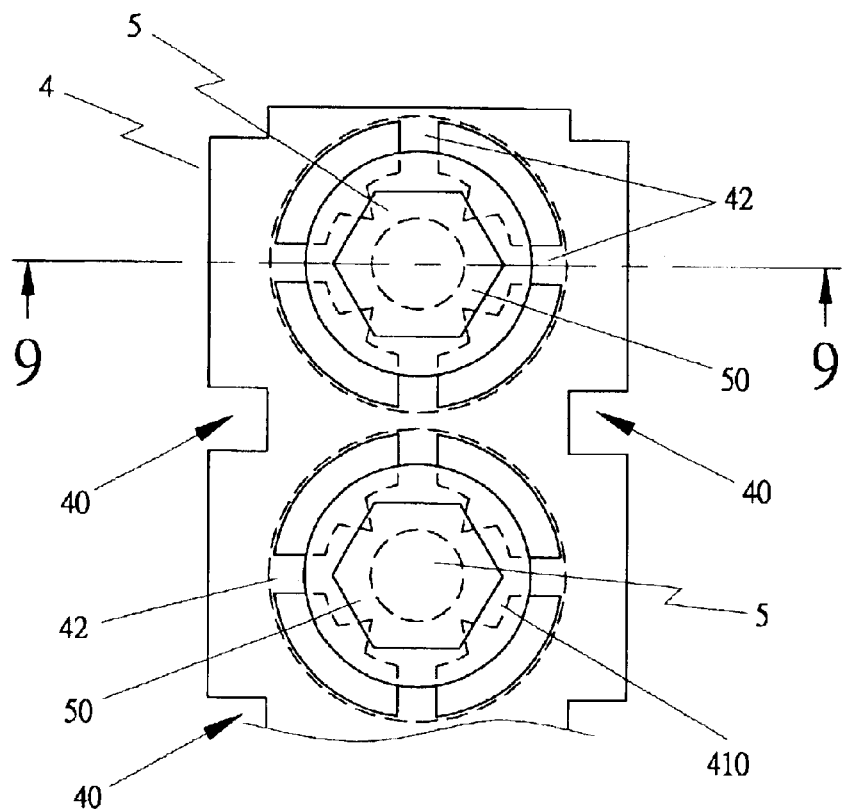
FIG. 8 is a partial upper view of a second preferred embodiment of a screw band with washers in the present invention.
Figure 9:
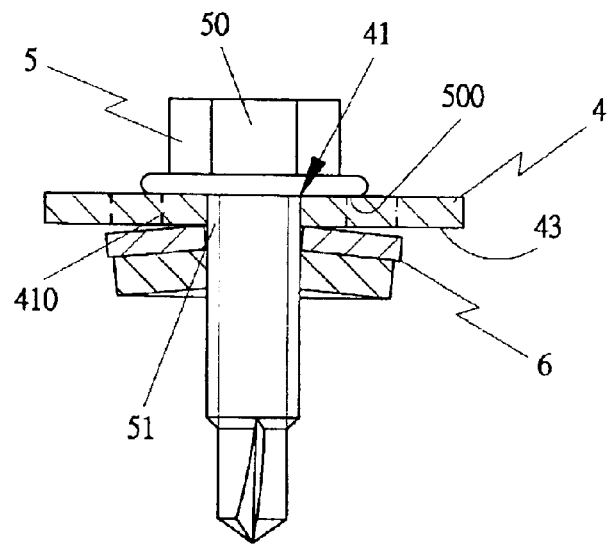
FIG. 9 is a cross-sectional view of the line 9—9 in FIG. 8.

Next, FIGS. 8 and 9 show a second embodiment of a screw band with washers, having the same structure as the first preferred embodiment, except the shape of the screw band. So it is quite obvious that the shape of the screw band used in the first and the second preferred embodiment does not matter. And the washers in the second preferred embodiment more closely contact with the lower surface 43 of the screw band 4.

Figure 10:
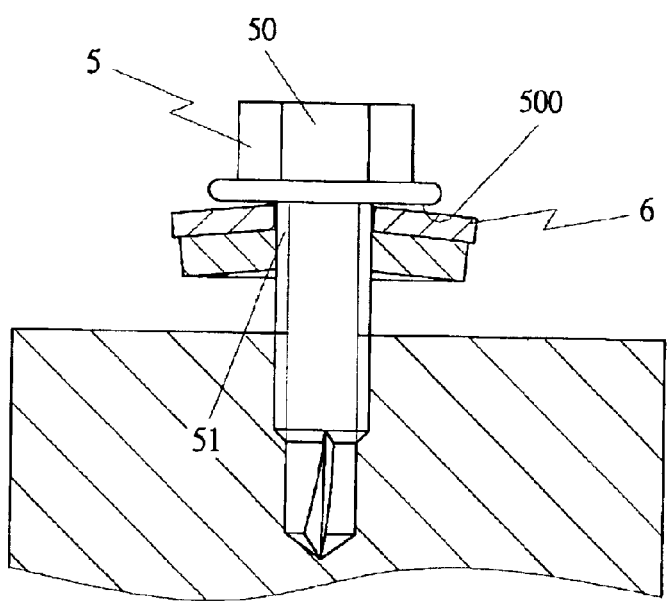
FIG. 10 is a side view of a screw with a washer in the screw band being driven in an object in the present invention.

In addition, as shown in FIG. 10, the washer 6 does not come near to the surface of an object until the screw 5 is completely driven in the object, so there is no wear issue of the washer, which can sandwich the screw band in conjunction with the head of the screw 5, keeping strictly vertical the screw 5 without inclining during being driven by a driving tool, facilitating operation and elevating work effectiveness.

While the preferred embodiments of the invention have been described above, it will be recognized and understood that various modifications may be made therein and the appended claims are intended to cover all such modifications that may fall within the spirit and scope of the invention.

What is claimed is:

1. A screw band with washers comprising a screw band provided with a plurality of tooth grooves formed respectively spaced apart equidistantly in two lengthwise sides and a plurality of screw holes formed spaced apart equidistantly in the lengthwise center for receiving a plurality of screws, the shank of each said screw fitted in each said screw hole, each said screw hole having a pinching surface closely contacting with a lower surface of the head of each said screw, a washer fitted around the shank of each said screw closely contacting with a lower surface of said screw band, the head of each said screw and each said washer sandwiching said screw band so that each said screw is kept strictly perpendicular to said screw band and subsequently each said screw can be driven in an object smoothly without inclining to any side, each said washer not functioning to impede each said screw during being driven in an object.

* * * * *